United States Patent [19]
Durling

[11] 4,119,351
[45] Oct. 10, 1978

[54] AIR BRAKE SYSTEM WITH PRESSURE HOLDING VALVE

[75] Inventor: Harold Durling, Elsie, Mich.

[73] Assignee: Midland-Ross Corporation, Cleveland, Ohio

[21] Appl. No.: 769,548

[22] Filed: Feb. 17, 1977

[51] Int. Cl.² .............................................. B60T 15/20
[52] U.S. Cl. .................. 303/6 M; 137/493.9; 303/69; 303/77; 303/82
[58] Field of Search .................... 303/6 M, 37, 38, 40, 303/42, 69, 75, 77, 82; 137/493.9

[56] References Cited

U.S. PATENT DOCUMENTS

| | | | |
|---|---|---|---|
| 2,706,487 | 4/1955 | Wilson | 303/69 |
| 3,285,672 | 11/1966 | Avrea | 303/6 M |
| 3,394,968 | 7/1968 | Bueler | 303/40 |
| 3,439,873 | 4/1969 | Relf | 137/493.9 |
| 3,862,782 | 1/1975 | Horowitz et al. | 303/40 |
| 4,016,904 | 4/1977 | Gordon | 137/493.9 |

*Primary Examiner*—Edward R. Kazenske
*Attorney, Agent, or Firm*—H. Duane Switzer

[57] ABSTRACT

A vehicle air brake system includes spring set air released parking brakes to which air is supplied through a pressure holding valve which maintains the air chambers of the parking brakes at a predetermined pressure even though the air brake system may be at operating pressures substantially lower than the predetermined pressure. When the air pressure in the air brake system falls below operational levels, the pressure holding valve responds to release the air from the parking brake chambers.

3 Claims, 4 Drawing Figures

4,119,351

AIR BRAKE SYSTEM WITH PRESSURE HOLDING VALVE

BACKGROUND OF THE INVENTION

This application relates to the art of vehicle air brake systems and valves used therein. More specifically, the invention relates to an improved pressure holding valve for maintaining spring set parking brakes in a released condition even though the air brake system is at relatively low operating pressures. Although the improved pressure holding valve of the present application is particularly applicable for use in an air brake system and will be described with reference thereto, it will be appreciated that the valve can be used in other systems where it is desired to prevent backflow until a predetermined pressure differential develops.

Known vehicle air brake systems include spring set air released parking brakes. One system including a parking brake of this type is disclosed in U.S. Pat. No. 3,285,627 issued Nov. 15, 1966, to Avrea. In systems of this type, release of the parking brakes requires a predetermined pressure of around 80 psig. The air brake system itself is normally operated at a pressure of around 125 psig. During stop and go driving or other heavy brake usage periods, it is possible for the air supply to be depleted faster than the compressor can recharge it. Therefore, the brake system may be at operational pressures between 30–80 psig where the vehicle service brakes can still be operated. At these relatively low operational pressures, the air in the parking brakes would normally bleed down to the same operational pressure. When the air in the parking brakes is at a pressure less than 80 psig, the parking brake is partially applied. As the air pressure is further depleted, the parking brake is applied with greater force under the spring bias. It would be desirable to have a system in which the parking brakes would not drag at relatively low operational pressures of the air brake system.

SUMMARY OF THE INVENTION

An air brake system of the type described includes a pressure holding valve between the air supply and the parking brakes to maintain a predetermined pressure in the parking brake air chambers to hold same released when the air brake system is at operational pressures below the predetermined pressure. This prevents dragging of the parking brakes when the air brake system is at operational pressures below the minimum predetermined pressure required to hold the parking brakes completely released. When the air pressure in the air brake system falls below operational pressure levels, the pressure holding valve is operative to exhaust air from the parking brake air chambers.

In one arrangement, the pressure holding valve is incorporated in a common valve body with a quick release valve device for releasing pressure from the parking brake air chambers to atmosphere.

The pressure holding valve includes air inlet and delivery ports, and is operative to provide flow therethrough from the inlet port to the delivery port when there is a pressure drop from the inlet port to the delivery port. The pressure holding valve is operative to block flow therethrough from the delivery port to the inlet port when there is a relatively low pressure drop from the delivery port to the inlet port. When there is a relatively high pressure drop from the delivery port to the inlet port, the pressure holding valve is operative to provide flow therethrough from the delivery port to the inlet port.

In one arrangement, a check valve is interposed between the inlet and delivery ports, and movable pressure responsive means is located between the inlet and delivery ports for providing flow past the check valve from the delivery port to the inlet port in response to a high pressure drop from the delivery port to the inlet port. The pressure responsive means may comprise a hollow piston having one end normally engaging the check valve which is yieldably biased against one piston end. The piston is responsive to a high pressure drop from the delivery port to the inlet port for moving away from the check valve.

It is a principal object of the present invention to provide an improved vehicle air brake system having a pressure holding valve for holding parking brakes disengaged at relatively low system pressures.

It is an additional object of the invention to provide an improved pressure holding valve.

It is also an object of the invention to provide an improved pressure holding valve combined with a quick release valve device.

It is a further object of the invention to provide an air brake system having valve means for preventing dragging of the parking brakes even though the system may be at relatively low operational pressures.

DESCRIPTION OF A PREFERRED EMBODIMENT

Figure 1:
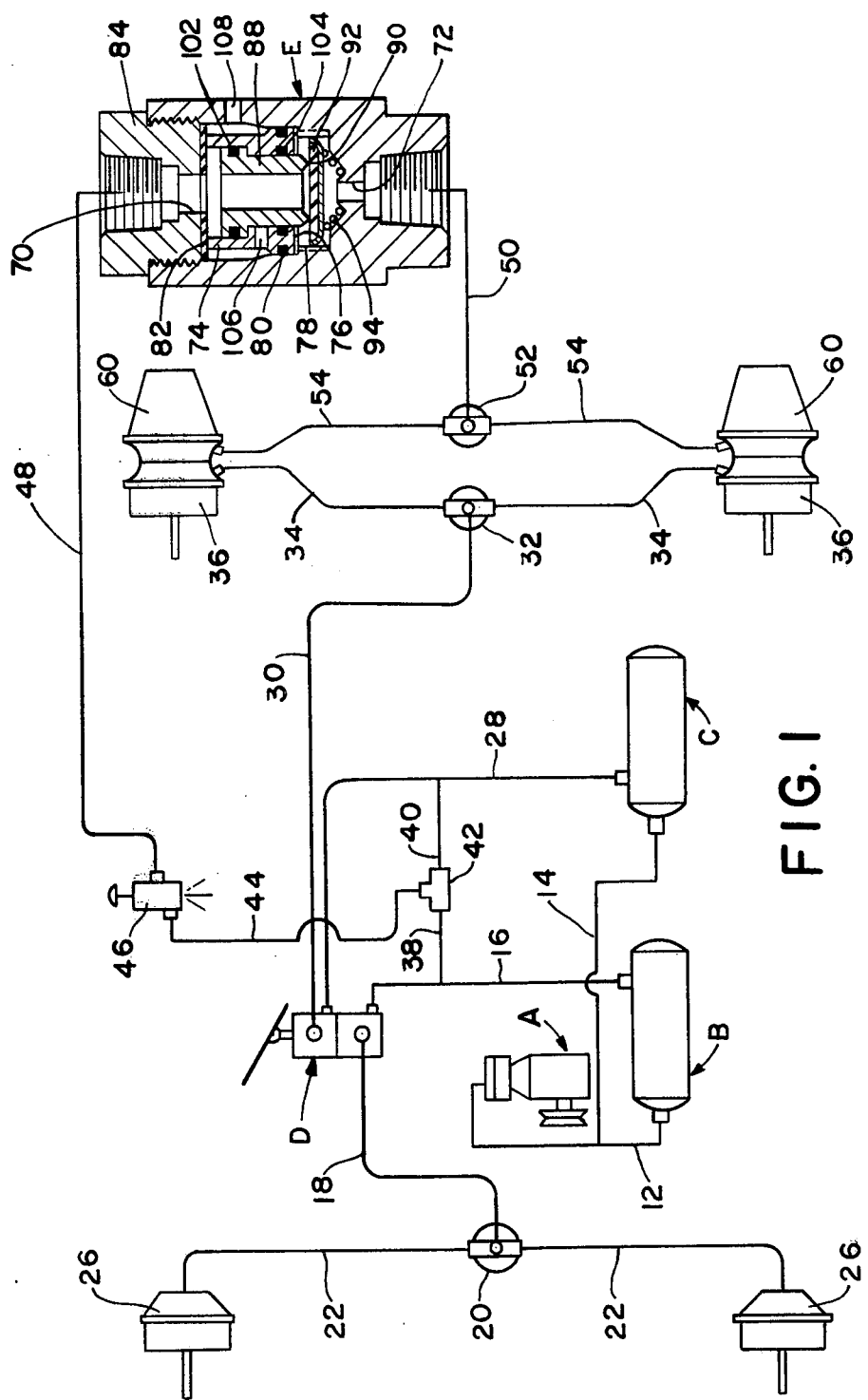
FIG. 1 is a schematic illustration of a vehicle air brake system having the improved valve of the present application incorporated therein.

With reference to the drawing, FIG. 1 is a very schematic illustration of a vehicle air brake system including an engine driven air compressor A supplying air through conduits 12 and 14 to reservoirs B and C. Reservoir B supplies air through conduit 16, treadle valve D, conduit 18, quick release valve device 20 and conduits 22 to front brake actuators 26. Reservoir C is connected by conduit 28, treadle valve D, conduit 30, quick release valve device 32, and conduits 34 with rear brake actuators 36. Conduits 16 and 28 from reservoirs B and C are also connected by conduits 38 and 40 with a two-way check valve 42 which is connected by conduit 44 with a parking brake control valve 46. Conduit 48 connects parking brake control valve 46 with pressure holding valve E which in turn is connected through conduit 50, quick release valve device 52 and conduits 54 with parking brakes 60. Parking brakes 60 may be of the type disclosed in FIG. 2 of U.S. Pat. No. 3,285,672 issued Nov. 15, 1966, to Avrea. The parking brake is mounted coaxially with the rear brake actuators. Coil springs normally bias the parking brakes to an engaged position, and air chambers are supplied with air at a predetermined pressure to overcome the spring force and hold the parking brakes in a released position.

In conventional air brake systems, there is no pressure holding valve E. Air is supplied through parking brake control valve 46 to the air chambers of the parking brakes for releasing the parking brakes. Air pressure of around 80 psig is required in the air chambers of the parking brakes for completely releasing same. In a normal system, depletion of air pressure in the reservoirs so that air pressure in conduit 44 is below 80 psig will also cause air to bleed back from the parking brake air chambers through parking brake control valve 46 into the system. This depletion of air pressure in the air chambers of the parking brakes causes an application of the parking brakes so that they drag. When it is desired to intentionally apply the parking brakes, parking brake control valve 46 is operated to close conduit 44 for protecting the air pressure in the remainder of the system while exhausting pressure in conduit 48 to atmosphere so that the air in the parking brake chambers also bleeds to atmosphere through quick release valve 52.

In accordance with the present application, pressure holding valve E is connected between parking brake control valve 46 and the air chambers of parking brakes 60 in order to hold a predetermined pressure of at least 80 psig in the air chambers of parking brakes 60 even though the air pressure in the remainder of the system and in conduit 44 is at operational pressures below 80 psig. However, once the air pressure in the remainder of the system and conduit 44 falls below operational levels, pressure holding valve E operates to dump the air from the air chambers of parking brakes 60.

Pressure holding valve E includes an inlet port 70 communicating with conduit 48 and a delivery port 72 communicating with conduit 50. The body of valve E has a bore between ports 70 and 72 receiving a sleeve member 74 having a bottom end 76 with a plurality of circumferentially-spaced radially extending flutes thereon to define flow channels therebetween. Bottom end 76 is seated on the upper ends of a plurality of circumferentially-spaced axially extending flutes 78 which define axial flow passages therebetween. An outer circumferential seal 80 is positioned between sleeve member 74 and the bore in which it is received. The upper end of sleeve member 74 sealingly engages a gasket 82 located between sleeve member 74 and cap member 84.

Pressure responsive means in the form of a hollow piston 88 is reciprocatingly received in sleeve member 74 and having one end 90 defining a circumferential valve seat cooperating with check valve disc 92 which is reciprocatingly guided within flutes 78 and normally biased away from delivery port 72 toward piston end 90 by biasing means in the form of a coil spring 94. Axially spaced circumferential seals 102 and 104 are provided around piston 88, and the area of piston 88 enclosed by seal 102 is substantially greater than the area of piston 88 enclosed by seal 104. A vent hole 106 extends radially through sleeve member 74 to communicate with the exterior of piston 88 between seals 102 and 104, and an atmospheric vent 108 extends through the body of valve E so that the exterior surface of piston 88 between seals 102 and 104 is at atmospheric pressure.

Pressure holding valve E is generally in the position of FIG. 1 when the system is being charged. Air pressure entering inlet port 70 acts through hollow piston 88 against check valve disc 92 for displacing same away from piston end 90 for flow of air around check valve disc 92 through the spaces between flutes 78 and delivery port 72 to the air chambers of parking brakes 60.

Figure 2:
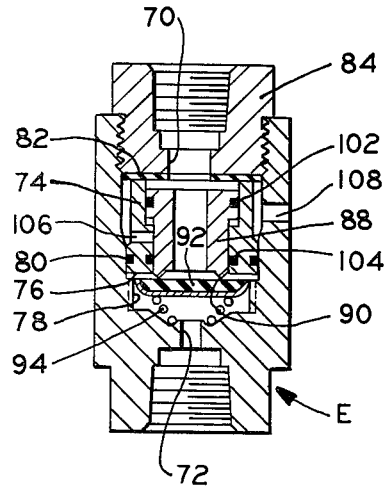
FIG. 2 is a cross-sectional elevational view showing the valve in a different operational mode.
Figure 3:
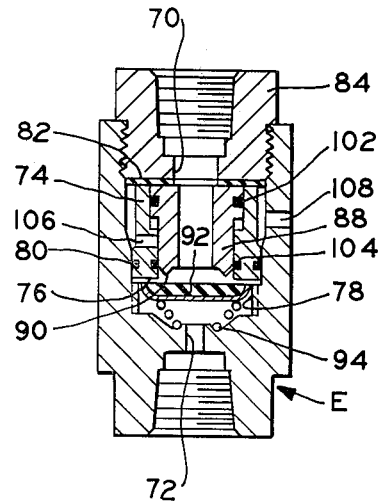
FIG. 3 is a cross-sectional elevational view of the pressure holding valve in still another operational mode.

Whenever the operational pressure of the brake system and at inlet port 70 is less than the predetermined pressure at delivery port 72, pressure holding valve E will assume the position shown generally in FIG. 2. In this position, the pressure in the air chambers of the parking brakes is greater than the operational pressure acting through inlet port 70. Therefore, the reverse pressure acting on check valve 92 displaces same and piston 88 toward inlet port 70. Pressure holding valve E will prevent reverse flow from the parking brake air chambers back into the system at operational pressures as low as 30 psig. However, when the operational pressure at inlet port 70 falls below around 30 psig, pressure holding valve E assumes the position shown in FIG. 3 wherein communication is established from delivery port 72 to inlet port 70 past check valve 92 by flowing through flutes 78 and flutes on bottom end 76 of sleeve member 74, past piston end 90 and through the interior of hollow piston 88.

In the valve position of FIG. 2, the force acting downwardly on piston 88 is equal to system pressure at inlet port 70 times the difference between the area of piston 88 enclosed within seal 102 and the area enclosed within seat 90. In the position of FIG. 2, this downward force on the piston is equal to the upward force which is the pressure in the air chambers of the parking brakes times the difference between the area of piston 88 enclosed within seal 104 and the area enclosed by seat 90. When this upward force acting on piston 88 exceeds the downward force, piston 88 moves to the position of FIG. 3 so that air can be exhausted from the parking brake air chambers. Pressure holding valve E will assume the position of FIG. 3 when a system failure occurs or by operating parking valve 46 to exhaust conduit 48 to atmosphere so that the pressure acting at inlet port 70 is atmospheric pressure.

Check valve 92 provides flow from inlet port 70 to delivery port 72 when there is a pressure drop from inlet port 70 to delivery port 72. Check valve 92 prevents reverse flow when there is a relatively low pressure drop from delivery port 72 to inlet port 70. When there is a relatively high pressure drop from delivery port 72 to inlet port 70, the pressure responsive means defined by piston 88 moves away from check valve 92 for allowing flow therepast from delivery port 72 to inlet port 70.

Figure 4:
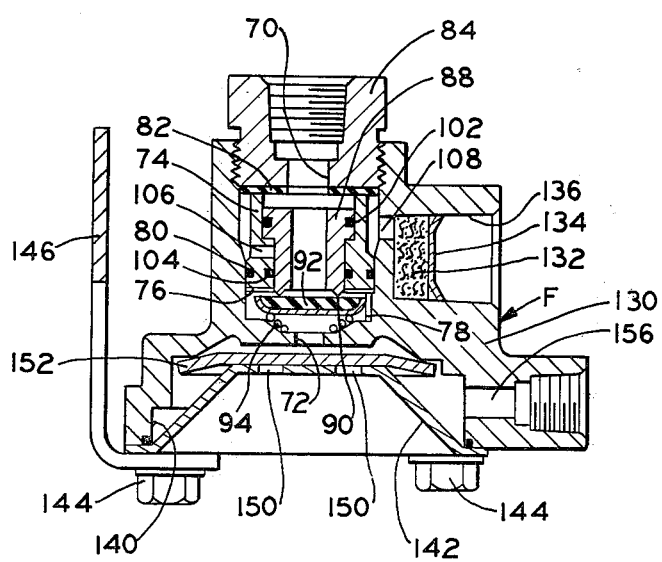
FIG. 4 is a cross-sectional elevational view of a pressure holding valve combined with a quick release valve device.

FIG. 4 shows a pressure holding valve combined with a quick release valve device. The combined valve F of FIG. 4 is a combination of pressure holding valve E of FIG. 1 with quick release valve device 52. In the arrangement of FIG. 4, the pressure holding valve and the quick release valve device are combined in a common one-piece body 130. A filter 132 and filter retainer 134 are positioned in a bore 136 outwardly of atmospheric vent 108 to prevent entry of dirt into the valve through the atmospheric vent port.

An enlarged cavity 140 in the base of valve body 130 has a cone-shaped member 142 positioned therein and secured to body 130 as by fasteners 144 which also secure a mounting bracket 146 thereto. Member 142 has atmospheric vent ports 150 therethrough normally closed by a flexible rubber diaphragm 152. An outlet port 156 communicates with cavity 140 between diaphragm 152 and cone member 142. When the air chambers of the parking brakes are being charged, air flows from delivery port 72 past the outer periphery of diaphragm 152 through outlet port 156 which is connected to conduits 54 of FIG. 1 leading to the air chambers of parking brakes 60. When there is a high pressure drop from delivery port 72 to inlet port 70, the pressure holding valve assumes the position in FIG. 3 and there is no longer any pressure acting downwardly on diaphragm 152 for holding same in engagement with cone member 142 to close atmospheric vent ports 150. Therefore, the back pressure acting through outlet port 156 from the air chambers of the parking brakes displaces diaphragm 152 upwardly in FIG. 4 away from cone member 142 so that the air in the parking brake air chambers is discharged to atmosphere through atmospheric vent ports 150.

Although the invention has been shown and described with respect to certain preferred embodiments, it is obvious that equivalent alterations and modifications will occur to other skilled in the art upon the reading and understanding of this specification. The present invention includes all such equivalent alterations and modifications, and is limited only by the scope of the claims.

I claim:

1. A vehicle air brake system including spring set air released parking brakes, air supply means for supplying air at a predetermined pressure to said parking brakes for releasing same, a pressure holding valve interposed between said air supply means and said parking brakes for maintaining air in said parking brakes at said predetermined pressure when said air supply means falls to operational pressures above atmospheric pressure and below said predetermined pressure, said pressure holding valve being operative to exhaust said predetermined pressure from said parking brakes when said air supply means falls below said operational pressures, said pressure holding valve including inlet and delivery ports having a check valve interposed therebetween for normally providing flow directly therepast along a flow path from said inlet port to said delivery port and blocking reverse flow, a movable hollow piston between said inlet and delivery ports, said piston having one end normally engaging said check valve and said check valve being yieldably biased against said one end, said flow path including flow between said check valve and said one end of said piston, said piston being responsive to a high pressure drop from said delivery port to said inlet port for moving away from said check valve and providing flow directly past said check valve in an opposite direction along said flow path, axially-spaced seals around said piston, and an atmospheric vent port between said seals.

2. A pressure holding valve having inlet and delivery ports, a single check valve between said ports for normally providing flow directly therepast in one direction from said inlet port to said delivery port while blocking reverse flow, movable pressure responsive means movable in response to a high pressure drop from said delivery port to said inlet port for providing flow directly past said check valve in an opposite direction from said delivery port to said inlet port, said pressure responsive means comprising a hollow piston and said check valve being positioned between said delivery port and said piston and being yieldably biased into engagement with one end of said piston, said piston being movable away from said check valve in response to a high pressure drop from said delivery port to said inlet port for disengaging said one end from said check valve and providing flow past said check valve through said piston from said delivery port to said inelt port, axially-spaced seals around said piston, and an atmospheric vent port communicating with the exterior of said piston between said seals.

3. A pressure holding valve having inlet and delivery ports, a single check valve between said ports for normally providing flow directly therepast in one direction from said inlet port to said delivery port while blocking reverse flow, movable pressure responsive means movable in response to a high pressure drop from said delivery port to said inlet port for providing flow directly past said check valve in an opposite direction from said delivery port to said inlet port, said valve including a cylinder and said movable pressure responsive means comprising a piston received in said cylinder, said piston having a first piston end facing toward said inlet port and a second piston end facing toward said delivery port, said piston having an axial piston passage therethrough, a first circumferential seal between said piston and cylinder adjacent said first piston end, a second circumferential seal between said piston and cylinder adjacent said second piston end, said piston having a substantially greater area enclosed by said first seal than by said second seal, said check valve comprising a valve disc positioned between said delivery port and said second piston end, biasing means for normally biasing said check valve toward said second piston end, said check valve disc being positioned in a bore in said valve, said bore having peripheral longitudinal flutes, radial flutes extending across the end of said cylinder facing said valve disc to intersection with said longitudinal flutes, said second piston end being located between said radial flutes and said delivery port for flow of air through said piston passage from said inlet port to said delivery port, said second piston end being located between said radial flutes and said inlet port for flow of air through said piston passage from said delivery port to said inlet port.

* * * * *